US010325513B2

United States Patent
Uemura et al.

(10) Patent No.: US 10,325,513 B2
(45) Date of Patent: Jun. 18, 2019

(54) MUSICAL PERFORMANCE ASSISTANCE APPARATUS AND METHOD

(71) Applicant: YAMAHA CORPORATION, Hamamatsu-shi (JP)

(72) Inventors: Norihiro Uemura, Hamamatsu (JP); Akira Maezawa, Hamamatsu (JP); Motoji Nagata, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 246 days.

(21) Appl. No.: 15/486,717

(22) Filed: Apr. 13, 2017

(65) Prior Publication Data

US 2017/0221377 A1    Aug. 3, 2017

Related U.S. Application Data

(63) Continuation of application No. PCT/JP2015/079343, filed on Oct. 16, 2015.

(30) Foreign Application Priority Data

Oct. 17, 2014   (JP) .................................. 2014-212415

(51) Int. Cl.
  *G09B 15/00*  (2006.01)
  *G09B 15/02*  (2006.01)
  (Continued)

(52) U.S. Cl.
  CPC .............. *G09B 15/023* (2013.01); *G10G 1/00* (2013.01); *G10H 1/0008* (2013.01);
  (Continued)

(58) Field of Classification Search
  CPC ............... G09B 15/023; G10H 1/0008; G10H 2210/091; G10H 2220/015;
  (Continued)

(56) References Cited

U.S. PATENT DOCUMENTS 6,072,113 A * 6/2000 Tohgi ..................... G09B 5/065
  84/470 R
6,150,597 A * 11/2000 Kakishita ............. G10H 1/0025
  84/477 R (Continued)

FOREIGN PATENT DOCUMENTS

JP        2000056756 A    2/2000
JP        2003015636 A    1/2003
(Continued)

OTHER PUBLICATIONS

International Search Report issued in International Application No. PCT/JP20151079343 dated Dec. 15, 2015. Form PCT/ISA/210.
Written Opinion issued in International Application No. PCT/JP2015/079343 dated Dec. 15, 2015. Form PCT/ISA/237.
Office Action issued in Japanese Application No. 2014-212415 dated Jul. 31, 2018. English translation provided.

*Primary Examiner* — Jeffrey Donels
(74) *Attorney, Agent, or Firm* — Rossi, Kimms & McDowell LLP

(57) ABSTRACT

Musical score acquisition section acquires musical score information representing a musical score of a music piece to be practiced by a user. Target portion setting section sets a plurality of portions of the music piece as target portions for training, respectively. Target musical score acquisition section acquires target musical score information indicative of partial musical scores of the respective target portions for training set by the target portion setting section. Display control section controls, on the basis of the target musical score information acquired by the target musical score acquisition section, a display device to display two or more of target musical scores in a side-by-side arrangement. Thus, a user can easily grasp the plurality of target portions for training.

14 Claims, 10 Drawing Sheets

(51) Int. Cl.
*G10G 1/00* (2006.01)
*G10H 1/00* (2006.01)

(52) U.S. Cl.
CPC . *G10H 2210/061* (2013.01); *G10H 2210/091* (2013.01); *G10H 2220/015* (2013.01); *G10H 2220/121* (2013.01); *G10H 2240/131* (2013.01)

(58) Field of Classification Search
CPC ....... G10H 2220/121; G10H 2240/131; G10H 2210/061; G10G 1/00
USPC ........................................................ 84/483.1
See application file for complete search history.

(56) References Cited

U.S. PATENT DOCUMENTS 9,280,960 B1* 3/2016 Clarke ..................... G10H 7/00
2003/0005814 A1* 1/2003 Matsumoto ............ G09B 15/02
84/477 R

FOREIGN PATENT DOCUMENTS

| JP | 2004287457 A | 10/2004 |
| JP | 2005084069 A | 3/2005 |
| JP | 2006195022 A | 7/2006 |
| JP | 2007108292 A | 4/2007 |

* cited by examiner

FIG. 7

| TARGET LIST | | | | | | | | | |
|---|---|---|---|---|---|---|---|---|---|
| ACCOMPLISHMENT SITUATION | DATE OF SETTING | MEASURE AREA | TARGET MUSICAL SCORE | DEGREE OF IMPORTANCE | DEGREE OF DIFFICULTY | TAG INFORMATION | NO. OF UNEX. TIMES | NO. OF EXER. TIMES | DELETE |
| ☐ | 2004/ 09/07 | 15–16 1–2 | D2 | 5 | 4 | GRAIN OF SOUND | 5 | 4 | 🗑 |
| ☐ | 2004/ 09/06 | 39–42 | D3 | 3 | 3 | EXPRESSION | 3 | 2 | 🗑 |
| ☑ | 2004/ 09/03 | 9–10 | D1 | 2 | 4 | TEMPO | 0 | 4 | 🗑 |
| ... | ... | ... | ... | ... | ... | ... | ... | ... | ... |

MUSICAL PERFORMANCE ASSISTANCE APPARATUS AND METHOD

TECHNICAL FIELD

The present invention relates to a musical performance assistance apparatus and method which manage a target of training for a user about musical performance including instrumental performance and vocal performance and assist the user in his/her performance practice in the target of training.

BACKGROUND ART

When a trainee practices on a performance of a music piece, the trainee or a trainer, for example, is used to writing various information such as a problem of the performance and/or an interpretation on musical performance onto a sheet of a musical score. However, when an amount of information written onto the sheet of the musical score has increased, it becomes difficult to put the information in order and it causes training efficiency to decrease. For example, there would occur a case where the trainee cannot grasp target portions for training in the music piece.

In a musical training system disclosed in Patent Literature 1, training schedule data representing a schedule of training and a result of training is produced on the basis of a trainee's request and performance technique of the trainee. Thus, it is possible for a user to practice a performance of a music piece according to the training schedule data.

PRIOR ART LITERATURE

Patent Literature

Patent Literature 1: Japanese Patent Application Laid-open Publication No. 2004-287457

According to the musical training system disclosed in Patent Literature 1, however, if there are a plurality of target portions for training in the music piece, it is impossible for the user to easily grasp the plurality of target portions for training.

SUMMARY OF INVENTION

In view of the foregoing, it is an object of the present invention to provide a musical performance assistance apparatus and method capable of making a user easily grasp a plurality of target portions for training.

In order to accomplish the above-mentioned object, the present invention provides a musical performance assistance apparatus which comprises: a display device; and a processing device configured to function as: a target portion setting section that sets a plurality of portions of a music piece to be practiced by a user as target portions for training; a target musical score acquisition section that acquires partial musical scores as target musical scores, each of the partial musical scores representing at least a part of one of the target portions for training set by the target portion setting section; and a display control section that causes the display device to display two or more of the target musical scores, acquired by the target musical score acquisition section, in a side-by-side arrangement.

According to the aforementioned arrangement, because the plurality of portions of the music piece to be practiced are set as the target portions for training and the target musical scores representing the target portions for training are displayed in the side-by-side arrangement, the user can easily grasp a plurality of target portions for training. In this way, it is possible for the user to efficiently practice the plurality of target portions for training. For example, in a case where a plurality of the target musical scores are dispersed in a whole musical score, these plurality of the target musical scores can be displayed side by side within one page of the screen, and thus it is not necessary for the user to turn a page of the musical score when the user practices only the target portions for training.

In an embodiment, the processing device may be further configured to function as a display order determination section that determines a display order of the target musical scores corresponding to the target portions on the basis of respective evaluation criteria for respective ones of the target portions, and the display control section may cause the display device to display the target musical scores in the display order determined by the display order determination section.

In this case, because the display order of the target portions can be adjusted on the basis of the evaluation criteria such as a degree of importance, a degree of difficulty or the like, the user can easily grasp an order, etc. of the target portions to be practiced. Thus, efficiency of the practice is enhanced.

In an embodiment, the processing device may be further configured to function as a connected musical score creation section that creates a connected musical score consisting of two or more of the target musical scores connected with each other, and the display control section may cause the display device to display the connected musical score created by the connected musical score creation section.

In this case, the user can successively practice the plurality of target portions as he/she views the displayed connected musical score. Thus, efficiency of training is enhanced.

In an embodiment, the processing device may be further configured to function as a performance information acquisition section that acquires performance information representative of a performance of the music piece performed by the user, and the target portion setting section may set the target portions for training from a whole musical score of the music piece on the basis of the performance information acquired by the performance information acquisition section.

In this case, because the performance information represents an actual performance of the music piece performed by the user, any portion of the musical score where the user failed to perform in the same way as indicated by the musical score can be set as a target portion for training on the basis of the performance information and the musical score of the music piece. In this way, the user can recognize a problem of his/her performance and efficiently practice the target portion for training.

In an embodiment, the processing device may be further configured to function as an additional information acquisition section that acquires additional information related to at least one of the target portions for training set by the target portion setting section, and the display control section may cause the display device to display the additional information along with the target musical score corresponding to the additional information.

In this case, because the additional information such as a degree of difficulty, a degree of importance, content of a target of training or the like can be displayed along with the target musical score, the user can recognize the additional information when he/she practices. Thus, efficiency of training is enhanced.

In an embodiment, the display control section may cause the display device to display a graphic image symbolizing content of the additional information to be displayed along with the target musical score corresponding to the additional information. In this way, the user can easily grasp the content of the displayed additional information at a glance.

In an embodiment, the additional information acquisition section may cause the display device to display a plurality of types of the graphic images symbolizing different types of the additional information, and acquires, in response to any one of the plurality of types of the graphic images selected by the user, one of the types of the additional information corresponding to the selected type of the graphic images. In this way, the user can easily input desired additional information.

The present invention may be constructed and implemented not only as the apparatus invention discussed above but also as a method invention. Also, the present invention may be arranged and implemented as a software program for execution by a processor, such as a computer or a DSP (digital signal processor), as well as a non-transitory computer-readable storage medium storing such a software program. In such a case, the program may be supplied to a user in the form of the storage medium and then installed in a computer of the user, or alternatively delivered from a server apparatus to a computer of a client via a communication network and then installed in the computer of the client. Further, the processor employed in the present invention may be a dedicated processor provided with a dedicated logic circuitry rather than being limited only to a computer or other general-purpose processor capable of running a desired software program.

BRIEF DESCRIPTION OF DRAWINGS

FIG. 7 is a diagram showing an example of a target list;

DESCRIPTION OF EMBODIMENTS

Now, preferred embodiments of the present invention will hereinafter be described in detail with reference to the accompanying drawings. In the following description, the term "performance" includes not only performance of various instruments but also vocal performance.

(1) Construction of Musical Performance Assistance Apparatus

Figure 1:
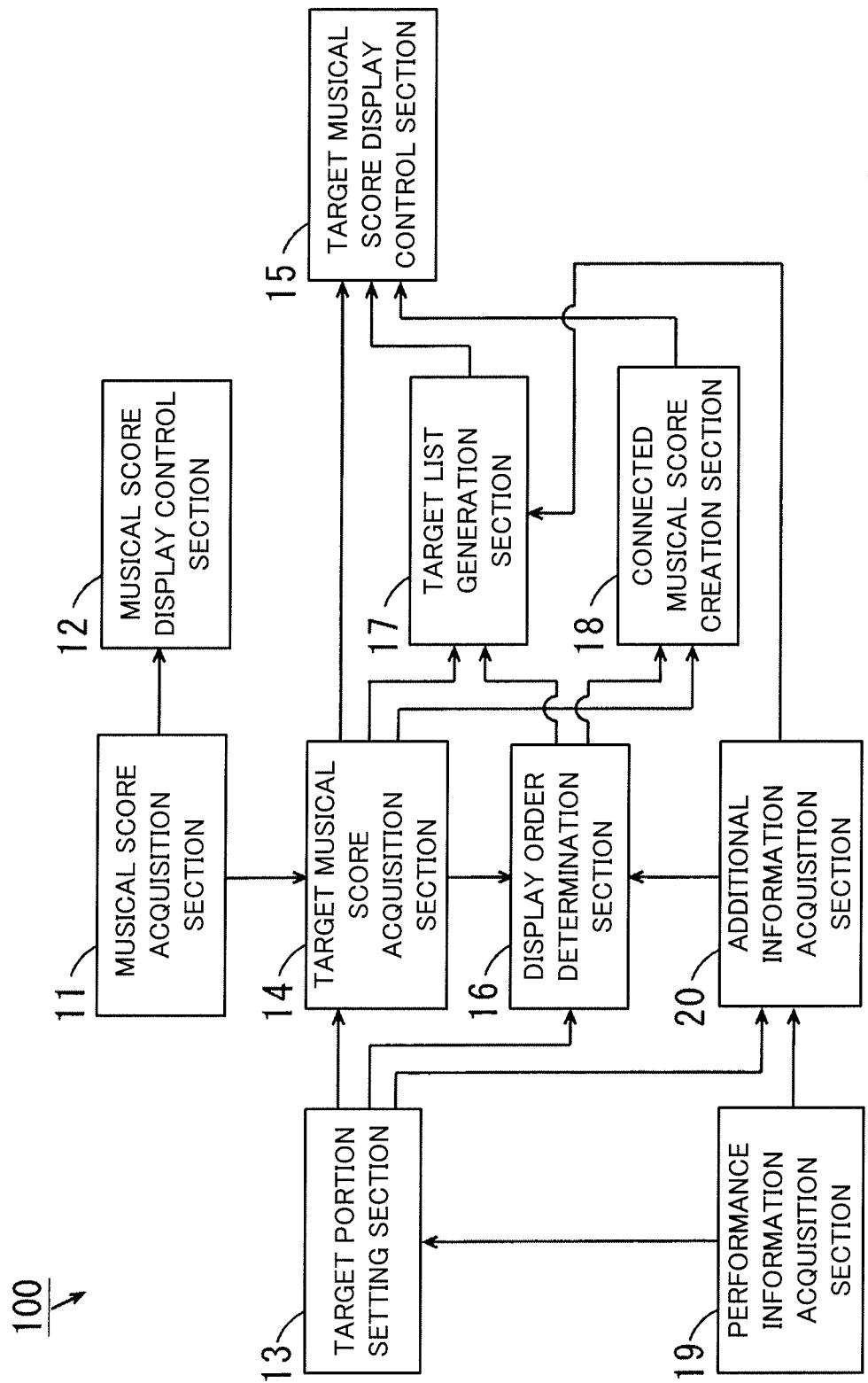
FIG. 1 is a functional block diagram showing a construction of a musical performance assistance apparatus according to an embodiment of the present invention.

FIG. 1 is a functional block diagram showing a construction of the musical performance assistance apparatus according to an embodiment of the present invention. In FIG. 1, the musical performance assistance apparatus 100 includes a musical score acquisition section 11, a musical score display control section 12, a target portion setting section 13, a target musical score acquisition section 14, a target musical score display control section 15, a display order determination section 16, a target list generation section 17, a connected musical score creation section 18, a performance information acquisition section 19, and an additional information acquisition section 20.

The musical score acquisition section 11 acquires musical score information representing a musical score of a music piece (hereinafter referred to as an original musical score). The musical score information includes various information shown in the original musical score such as a tempo, key name and beat of the music piece, a pitch (tone pitch) and duration (note value) of each of notes in the music piece, etc. The musical score information may be acquired via a computer network like the Internet, or may be acquired via a recording medium like a CD (compact disk). The musical score display control section 12 displays the original musical score based on the musical score information acquired by the musical score acquisition section 11.

The target portion setting section 13 sets a plurality of portions of a music piece to be practiced by a user as target portions for training. Setting of the target portions for training may be performed on the basis of an input operation by the user, or may be automatically performed on the basis of analysis of the musical score information, or may be performed on the basis of information acquired via the computer network, e.g., information for setting desired target portions for training may be received via the computer network. Further, any target portions for training may be set on the basis of performance information acquired by an aforementioned performance information acquisition section 19.

The target musical score acquisition section 14 acquires partial musical scores as target musical scores on the basis of the musical score information acquired by the musical score acquisition section 11, wherein each of the partial musical scores represents at least a part of one of the target portions for training set by the target portion setting section 13. The target musical score display control section 15 controls so as to display, on the basis of information indicative of the target musical scores acquired by the target musical score acquisition section 14, a plurality of target musical scores in a side-by-side arrangement on a display screen.

The display order determination section 16 determines a display order of the target musical scores corresponding to the target portions on the basis of respective evaluation criteria for respective ones of the target portions. The evaluation criteria, for example, may be selected by the user from among a plurality of predetermined conditions or terms. The target list generation section 17 generates target list information indicative of a target list on the basis of the information indicative of the target musical scores acquired by the target musical score acquisition section 14. The target list includes a plurality of target musical scores. In the embodiment, the plurality of target musical scores are disposed in the display order determined by the display order determination section 16. Further, additional information that will be mentioned later may be included in the target list.

The connected musical score creation section 18 creates connected musical score information indicative of a musical score (hereinafter referred to as a connected musical score) consisting of two or more of the target musical scores connected with each other. According to the embodiment, the plurality of target musical scores are connected in the display order determined by the display order determination section 16.

The performance information acquisition section 19 acquires performance information representative of an actual performance of the music piece performed by the user. The performance information, for example, may be acquired by inputting musical performance sound performed by the user through a microphone. Alternatively, the performance information may be acquired by inputting performance operation information from an electronic musical instrument when the user plays the music piece with the electronic musical instrument.

The additional information acquisition section 20 acquires additional information related to at least one of the target portions for training set by the target portion setting section 13. The additional information, for example, may be included any information such as a degree of difficulty, a degree of importance, a date of setting, the number of times that the user has already exercised the target portion (hereinafter referred to as "the number of exercised times"), the number of times that the user has to exercise the target portion hereafter (hereinafter referred to as "the number of unexercised times"), the time length for which the user has already exercised the target portion (hereinafter referred to as an "exercised time length"), the time length for which the user has to exercise the target portion hereafter (hereinafter referred to as an "unexercised time length"), matters to be noted in performance of the target portion, an accomplishment situation on a target for training, a due date of accomplishment of the target for training, etc. Further, the additional information may be included tag information mentioned later. The additional information may be acquired in the form of character/letter information, or may be acquired in the form of voice information. Further, the additional information may be acquired by means of user's input or based on an analysis of the musical score information, or may be acquired based on the performance information acquired by the performance information acquisition section 19. The additional information acquired by the additional information acquisition section 20 is supplied to the display order determination section 16 and the target list generation section 17.

Figure 2:
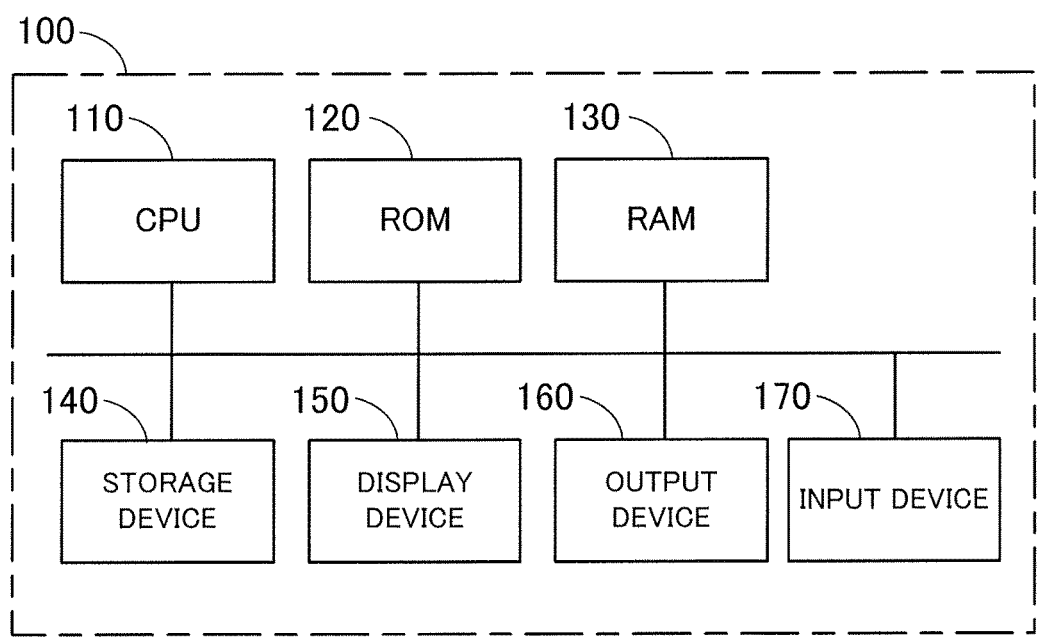
FIG. 2 is a block diagram showing an exemplary hardware setup of the musical performance assistance apparatus shown in FIG. 1.

FIG. 2 is a block diagram showing an exemplary hardware setup of the musical performance assistance apparatus 100 of FIG. 1. The musical performance assistance apparatus 100 is implemented as a personal computer, a tablet terminal, or a mobile phone, for example. The musical performance assistance apparatus 100 includes a CPU (central arithmetic processing device) 110, ROM (read-only memory) 120, RAM (random access memory) 130, a storage device 140, a display device 150, an input device 160 and an output device 170.

The ROM 120 comprises a nonvolatile memory for example, and stores therein a computer program such as a system program, a target management program, etc. The RAM 130 comprises a volatile memory for example, acts as a working area for the CPU 110, and temporarily stores therein various data. The CPU 110 carries out a target management process (namely a musical performance assistance process) described in detail later by executing a target management program, namely a musical performance assistance program, stored in the ROM 120 and running on the RAM 130. In this way, functions of the respective components shown in FIG. 1 are realized by the CPU 110 executing necessary programs.

The storage device 140 includes a recording medium (namely, memory) such as a hard disk, an optical disk, a magnetic disk, a memory card, etc. The storage device 140 stores therein, for example, the musical score information acquired by the musical score acquisition section 11, the target musical score information acquired by the target musical score acquisition section 14, the performance information acquired by the performance information acquisition section 19, and the additional information acquired by the additional information acquisition section 20. Also, the aforementioned target management program may be stored in the storage device 140.

The display device 150 comprises a liquid crystal display device, an organic EL (electro-luminescence) display device, a plasma display device, or the like. The musical score display control section 12 and the target musical score display control section 15 shown in FIG. 1 control the display device 150 to display the original musical score and the plurality of target musical scores on the display screen. The plurality of target musical scores may be displayed in the form of not only the target list but also the connected musical score.

The input device 160 includes a mouse and a keyboard. The user can carry out setting of desired target portions for training, inputting of desired additional information, etc. by operating the input device 160. The input device 160 may include a microphone or an electronic musical instrument. In this case, the user can input performance information using the microphone or the electronic musical instrument. Further, the display device 150 and the input device 160 may be integrated with each other as a single touch panel display (hereinafter abbreviated as "touch panel"). The output device 170 includes audio output terminals, a headphone, or the like. The output device 170 may include a speaker system.

The musical performance assistance apparatus 100 may comprise a DSP (digital signal processor) rather than the CPU 110, or may include a DSP in addition to the CPU 110. Further, a part or all of the components shown in FIG. 1 may be constructed by hardware components such as a dedicated electronic circuitry, etc.

(2) Setting of Target Portions for Training

Figure 3:
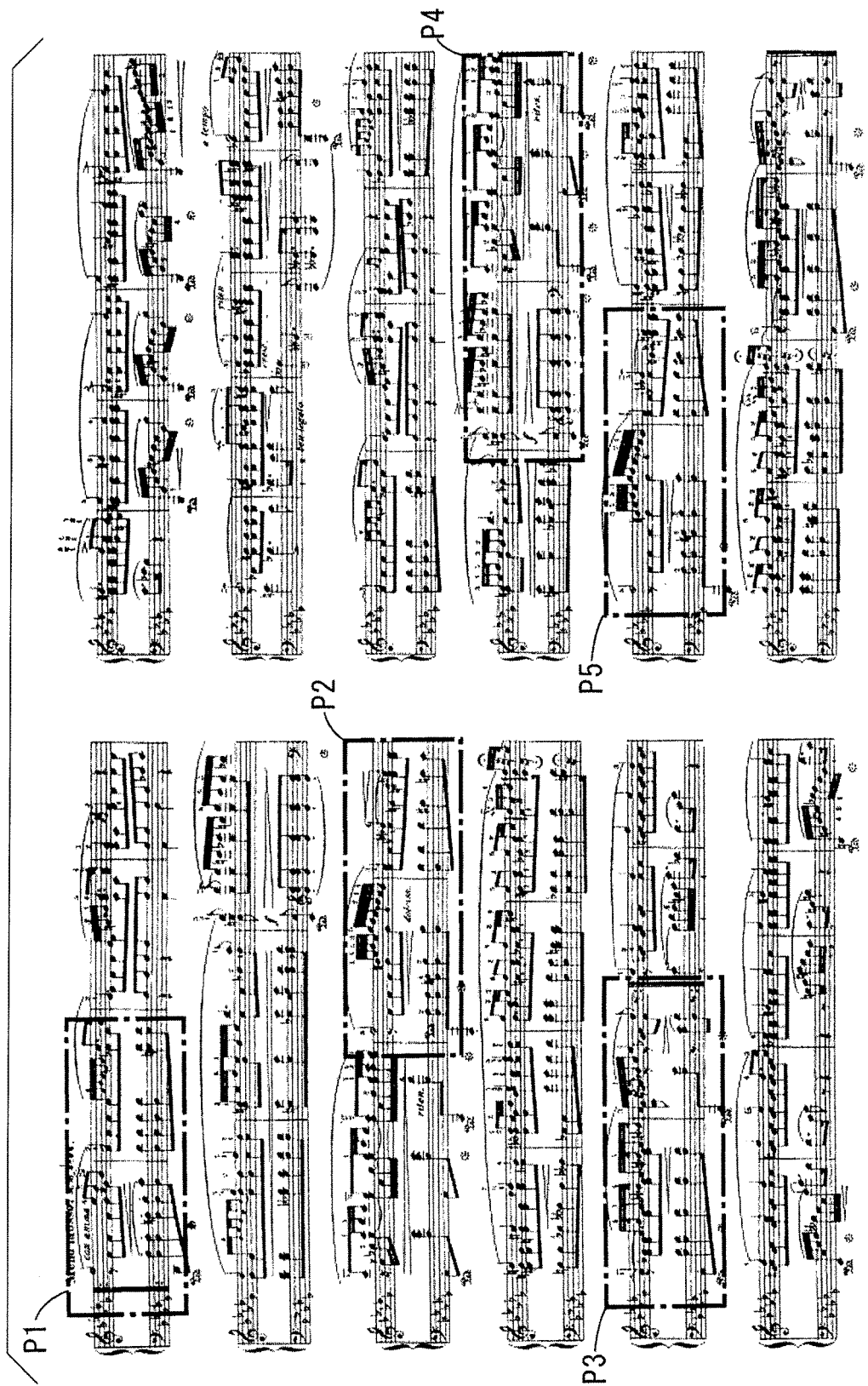
FIG. 3 is a diagram illustrating an example for setting target portions for training.

FIG. 3 is a diagram of a staff notation illustrating an example for setting target portions for training. FIG. 3 shows an example of an original musical score for piano. In the example, a target portion for training is set on a measure (or bar) basis so that a series of one or more measures (or bars) in a musical performance is set as one target portion for training. In the example of FIG. 3, measure areas (or bar areas) P1, P2, P3, P4 and P5 indicated in the FIG. 3 are different target portions for training respectively. Repeat marks are indicated at a start point of the measure area P1 and an end point of the measure area P3 so that the measure area P3 is followed by the measure area P1 in the musical performance. Therefore a group of the measure areas P3 and P1 is set as a common target portion for training. Also, even though the measure areas P4 and P5 are disposed on different staves of the staff notation, they are successively performed. Therefore a group of the measure areas P4 and P5 is set as a common target portion for training. It should be noted that even though a plurality of measure areas to be performed in series in the original musical score, each of the plurality of measure areas to be performed in series may be set as a separate target portion for training as described in detail later.

(2-1) Setting Based on an Operation of Input Device

The target portion setting section 13 of FIG. 1, for example, sets the target portions for training on the basis of an operation of the input device 160. The following is a description about an example of a way of setting the target portions for training based on an operation of the input device 160 in the case where the display device 150 and the input device 160 are constructed by a touch panel. In the embodiment, any target portion for training is set by the user operating the touch panel in a state that the original musical score is displayed on the touch panel.

Figure 4A:
FIG. 4A and FIG. 4B are a diagram illustrating a way of setting the target portions for training based on operation of an input device.
Figure 4B:
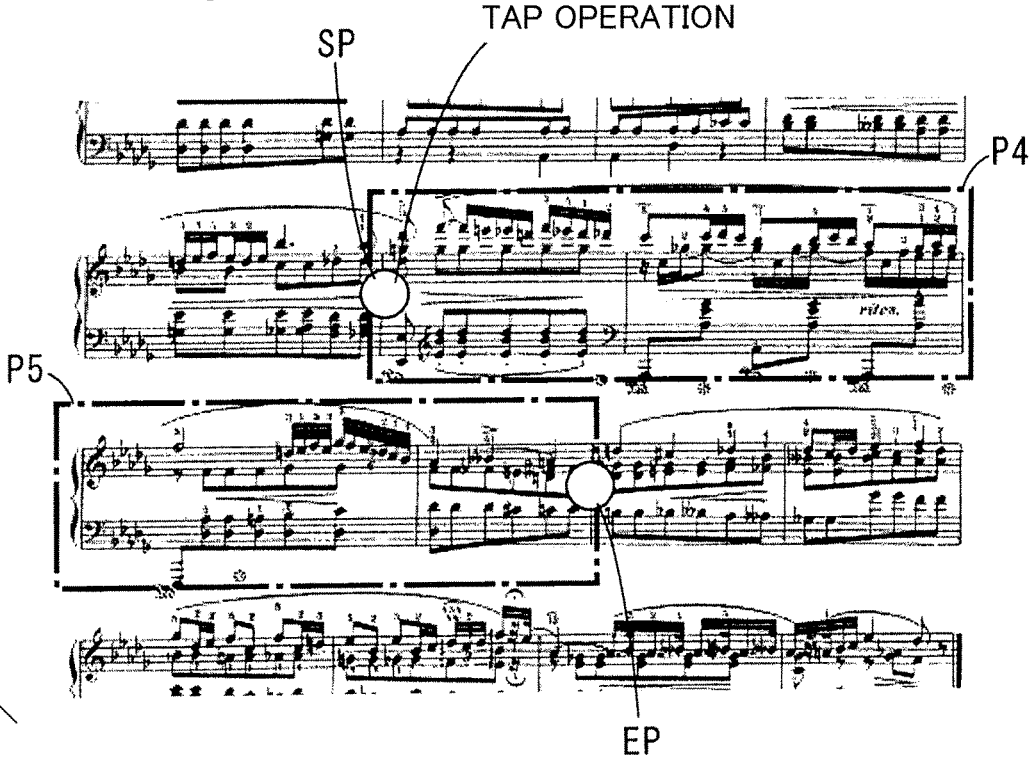

FIG. 4 is a diagram illustrating a way of setting the target portions for training based on the operation of the input device 160. In the embodiment of FIG. 4, the measure areas P4 and P5 shown in FIG. 3 are set as a desired target portion for training. For example, as shown in a part (a) of FIG. 4, the desired target portion for training may be set based on an operation performed by the user in such a manner as to trace from a start point to an end point of the desired target portion with his/her finger on the touch panel (namely a drag operation). Alternatively, as shown in a part (b) of FIG. 4, the desired target portion for training may be set based on an operation performed by the user in such a manner as to sequentially touch a start point SP and an end point EP of the desired target portion with his/her finger on the touch panel (namely a tap operation). The drag operation and/or the tap operation may be performed with a touch pen instead of the user's finger.

It should be noted that even such a case where the display device 150 and the input device 160 are provided separately and the input device 160 includes a mouse, the desired target portion for training can be set in the same manner as described above. In this case, the drag operation can be realized by moving the mouse in such a manner that a pointer displayed on the display device 150 is moved from the start point to the end point of the desired target portion while a button of the mouse is pushed. Also, in this case, a click of the mouse is performed instead of the tap operation in such a manner that the button of the mouse is pushed with the pointer positioned at either of the start and end points of the desired target portion (namely a click operation).

In such a case where the desired target portion for training is set with the aforementioned operation, it may be determined, according to a particular order in which individual ones of a plurality of the measure areas are designated, whether a group of the plurality of the measure areas should be set as a common target portion or each of the plurality of the measure should be set as a separate target portion. For example, when individual ones of successive measures are designated in an order same as a performance order of the successive measures, a group of the designated successive measures is set as a common target portion for training. On the other hand, when successive measures are designated in an order different from the performance order, each of the designated successive measures is set as a separate target portion for training.

For example, in the case of FIG. 3, when the measure area P1 is designated after the measure area P3 having been designated, a group of the measure areas P1 and P3 is set as a common target portion for training, whereas when the measure area P3 is designated after the measure area P1 having been designated, each of the measure areas P1 and P3 is set as a separate target portion for training. Further, when the measure area P5 is designated after the measure area P4 having been designated, a group of the measure areas P4 and P5 is set as a common target portion for training, whereas when the measure area P4 is designated after the measure area P5 having been designated, each of the measure areas P4 and P5 is set as a separate target portion for training.

Further, once a predetermined time period (e.g., three minutes) passes after any (one or more) of a plurality of successive measures has been designated as a measure area but prior to designation, as another measure area, of the remaining of the plurality of successive measures, then each of the successively-designated measure areas may be set as a separate target portion for training. For example, in the case of FIG. 3, once the predetermined time period passes after the measure area P3 has been designated but prior to designation of the measure area P1, then each of the successively-designated measure areas P3 and P1 may be set as a separate target portion for training. Similarly, once the predetermined time period passes after the measure area P4 has been designated but prior to designation of the measure area P5, then each of the successively-designated measure areas P4 and P5 may be set as a separate target portion for training.

In order that the user can easily recognize the target portions for training, an image indicative of a particular mark or the like (hereinafter referred to as a marking image) may be displayed in correspondence with each of the measure areas set as the target portions for training. For example, in a case where the target portions for training are set by the drag operation, the marking image can be depicted as a line drawn with a marker such as a highlighter so as to represent a trail of a finger or a touch pen. Different colors of the highlighter may be used depending on the date of setting, the degree of importance, the number of exercised times, the number of unexercised times, the accomplishment situation on the target, etc.

Figure 5:
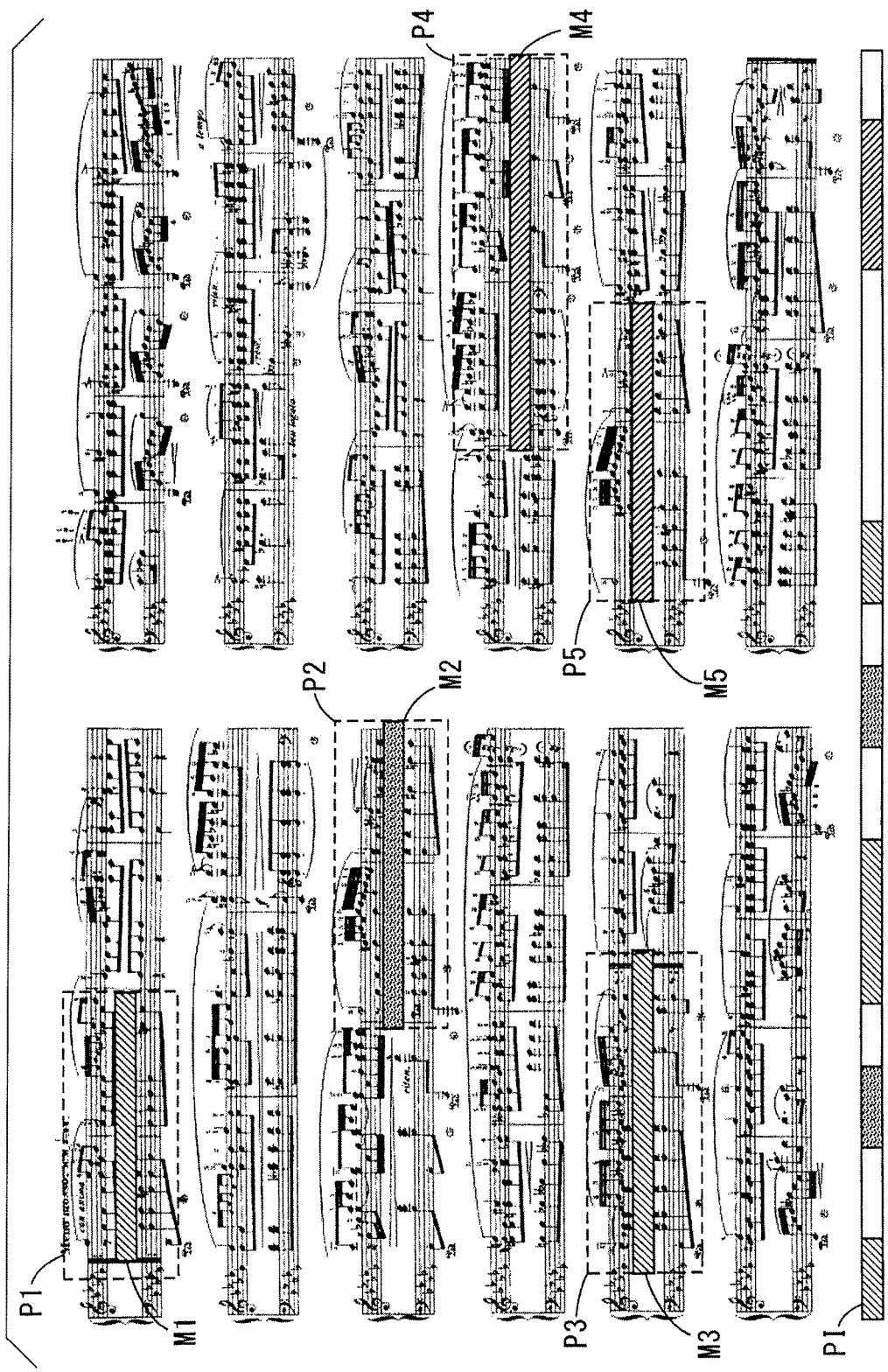
FIG. 5 is a diagram showing an example of a marking image.

FIG. 5 is a diagram showing an example of the marking image. In the example of FIG. 5, each of marking images M1, M2, M3, M4 and M5 is depicted in such a manner as to be overlapped with a corresponding one of the measure areas P1, P 2, P 3, P 4 and P 5. Each of the marking images M1, M2, M3, M4 and M5 is depicted as a line drawn with the corresponding marker. In a case where a plurality of the marking images correspond to a common target portions for training, the plurality of the marking images are painted in a same color. In the example of FIG. 5, the marking images M1 and M3 are painted in a same color, and the marking images M4 and M5 are painted in a same color. Further, in this example, the color of the marking images M1, M3 and the color of the marking images M4, M5 are different from each other.

In the example of FIG. 5, a target position display image PI schematically indicative of positions of the target portions for training is displayed along with the original musical score. The target position display image PI has a rectangle shape and represents an entire area of the musical piece in a direction of a long side of the rectangle shape. Namely, one end of the target position display image PI corresponds to a start point of the musical piece, and another end of the target position display image PI corresponds to an end point of the musical piece. In the target position display image PI, particular portions corresponding to the target portions for training are painted in a different color or colors than the other portion not corresponding to the target portions for training. In the example, each of the particular portions corresponding to the target portions for training is painted in a color same as the marking image corresponding to the target portion. In this way, the user can easily grasp the respective positions of the target portions for training.

(2-2) Setting Based on Musical Score Information and Performance Information

The target portion setting section 13 may automatically set the target portions for training on the basis of the musical score information and the performance information for the same music piece. The musical score information includes various information shown in the original musical score as mentioned above. On the other hand, the performance information represents an actual musical performance performed by the user. Problems on the musical performance of the user (i.e., targets for training) can be recognized by comparison of the musical score information and the performance information for the same music piece.

For example, in a case where, on the basis of comparison of a tempo of the original musical score represented by the musical score information and a tempo of the actual musical performance represented by the performance information, it is determined for any portion of the music piece that a difference between the both tempos exceeds a predetermined value or the both tempos continuously differ from each other over a predetermined time period, the determined portion is set as a target portion for training. Further, in a case where, on the basis of comparison of a pitch of the original musical score represented by the musical score information and a pitch of the actual musical performance represented by the performance information, it is determined for any portion of the music piece that a difference between the both pitches exceeds a predetermined value or the both pitches continuously differ from each other over a predetermined time period, the determined portion is set as a target portion for training. Also, a portion where a mistake in the actual musical performance such as a mistouch occurred may be set as a target portion for training. Further, when the user has erroneously repeatedly played a portion not to be played repeatedly (i.e., a portion where no repeat mark is indicated), such an erroneously-played portion may be set as a target portion for training. Alternatively, in a case where the user has erroneously repeatedly played the portion which should not be played repeatedly, when the number of erroneously-repeatedly-played times of the portion exceeds a predetermined value, then such the portion may be set as a target portion for training.

Such setting of the target portion for training based on the musical score information and the performance information as mentioned above may be carried out in real time at the time of the musical performance being performed by the user, namely at the time of receiving the performance information, or may be carried out after the musical performance by the user is terminated. Further, performance information for a plurality of times of user's performance may be acquired so that the target portions for training can be set based on the acquired performance information for the plurality of times of user's performance. For example, in a case where, as for a particular portion of the music piece, events to be targeted such a difference between the tempos or pitches or a mistake in the actual musical performance as mentioned above occurred more than a predetermined number of times, the particular portion may be set as a target portion for training.

(2-3) Other Examples of Setting

The target portion setting section 13 may statistically set target portions for training on the basis of information related to a plurality of users other than a particular user. For example, information of target portions for training related to the plurality of other users may be acquired via the computer network. On the basis of the acquired information, the target portion setting section 13 may specify a measure area which is set by more than a predetermined number of users as a target portion for training and set the specified measure area as a target portion for training for the particular user. Further, various measure areas set by the other users as target portions for training respectively may be extracted and, for each of the extracted measure areas, the number of users having set the measure area as the target portion for training may be displayed as an element of a histogram displayed on the display device 150. In such a case, the particular user can determine desired target portions for training with reference to content of the displayed histogram.

The target portion setting section 13 may set target portions for training on the basis of an analysis of the musical score information. For example, on the basis of an analysis of a tempo and notes in the original musical score, a portion of the musical score which includes a plurality of notes more than a predetermined number within a predetermined time period may be set as a target portion for training. Further, a portion of the musical score which includes a plurality of notes to be played within a predetermined time period and where a pitch range of the plurality of notes is larger than a predetermined range may be set as a target portion for training.

(3) Example of Acquisition of Additional Information

The additional information acquisition section 20 shown in FIG. 1 acquires additional information based on an operation of the input device 160, for example. In an example, the additional information is acquired on the basis of one or more matters to be noted in performance of the target portion, etc. which are written by the user on the touch panel. Further, the additional information may be acquired on the basis of character/letter information related to the target portion that is input by the user using the keyboard.

The additional information acquisition section 20 may acquires additional information indicative of a degree of difficulty of the target portion for training on the basis of an analysis of the musical score information. For example, on the basis of an analysis of a tempo and notes in the original musical score, as for each of the target portions for training, the number of musical notes to be played within a predetermined time period is calculated. Then, on the basis of the calculated number of musical notes, a degree of difficulty of each target portion for training is determined. The degree of difficulty, for example, is represented with any one of numerical values from "1" to "5" and determined so that the greater the numerical value is, the higher the degree of difficulty becomes. Further, as for each of the target portions for training, the degree of difficulty may be determined so that the higher the tempo in the original musical score is, the higher the degree of difficulty becomes, or that the wider the pitch range in the original musical score is, the higher the degree of difficulty becomes. Further, a degree of difficulty of the music piece itself may be determined based on the musical score information. For example, as for the whole of the music piece, the number of musical notes to be played within a predetermined time period may be calculated, and then the degree of difficulty of the music piece may be determined based on a maximum value or a mean value of the calculated number.

Further, the additional information acquisition section 20 may acquire additional information indicative of the number of exercised times (i.e., the number of times that the user has already exercised) or the exercised time length (i.e., the time length for which the user has already exercised) on the basis of the performance information acquired by the performance information acquisition section 19. Specifically, target portions for training that have already been played are specified based on the acquired performance information, and therefore, the number of exercised times for each of the target portions can be counted. Similarly, the exercised time length for each of the target portions can be measured. Thus, the number of exercised times and the exercised time length for each of the target portions can be acquired.

Further, the additional information acquisition section 20 may acquire additional information indicative of the number of unexercised times (i.e., the number of times that the user has to exercise hereafter) or the unexercised time length (i.e., the time length for which the user has to exercise hereafter) on the basis of the musical score information acquired by the musical score acquisition section 11 of FIG. 1 and the performance information acquired by the performance information acquisition section 19. For example, as for each of the target portions for training, the original musical score represented by the musical score information is compared against the actual musical performance represented by the performance information, and then a parameter indicative of an amount of a difference in performance between the original musical score and the actual musical performance is calculated. The number of unexercised times or the unexercised time length for the questioned target portion is set so that the greater a value of the calculated parameter is, the greater the number of unexercised times becomes, or the longer the unexercised time length becomes. Alternatively, the additional information acquisition section 20 may calculate remainder days or remaining time until a due date when the training of the target portion should be accomplished from now on, and may set the number of unexercised times or the unexercised time length based on a result of the calculation.

Further, the additional information acquisition section 20 may acquire an accomplishment situation on a target for training on the basis of the musical score information acquired by the musical score acquisition section 11 of FIG. 1 and the performance information acquired by the performance information acquisition section 19. For example, as for each of the target portions for training, the parameter indicative of the amount of the difference in performance between the original musical score and the actual musical performance may be calculated as describe above, and when a value of the calculated parameter is smaller than a predetermined value, it may be determined that the target for training about the questioned target portion has been accomplished.

Further, the additional information acquisition section 20 may acquire additional information commonly shared with some of a plurality of users other than a particular user. For example, addition information related to each of target portions for training is acquired from the plurality of users via the computer network. As for a common target portion for training, when the respective addition information acquired form the plurality of users is different from each other, particular addition information commonly shared between the most users may be representatively acquired as the additional information for the particular user. Also, in a case where the target portion for training for the particular user is set based on the information acquired from the other users as described above, additional information of the other users related to the target portion may be acquired at the same time of acquiring the information.

The additional information acquisition section 20 may acquire additional information represented by a human voice (namely, voice information). In this case, the input device 160 of FIG. 2 may include a microphone. The voice information comprises audio data, and a speech uttered by the user is acquired as the voice information by the additional information acquisition section 20. For example, in a case where target portions for training are set based on an operation of the input device 160 of FIG. 2, when an operation for setting a target portion is started, an acquisition (i.e., recording) of voice information corresponding to the target portion is started, and then the acquisition of the voice information is terminated when a predetermined time period expires after the operation. Alternatively, when a next operation for setting a next target portion is started, the acquisition of the voice information corresponding to the former target portion may be terminated, and then next acquisition (recording) of voice information corresponding to the next target portion may be started. The voice information may include audio data of a musical performance played by the user or trainer, or may include audio data of a musical performance acquired via the computer network, a recording medium, or the like.

Further, the acquisition of the voice information may be continuously carried out during running of the musical performance assistance apparatus 100, and only necessary portions corresponding to respective target portions for training may be reserved from among the acquired voice information. For example, a start time point of the reservation of the voice information corresponding to the target portion for training may be the same as a particular time point when an operation for setting the target portion for training is started, or may be a time point earlier for predetermined time (e.g., 5 seconds) than the particular time point. Further, an end time point of the reservation of the voice information corresponding to the target portion for training may be a time point when a predetermined time period expires after the operation for setting the target portion, or may be another time point when a next operation for setting a next target portion is started.

Further, a start button for starting an acquisition of the voice information and a termination button for terminating the acquisition may be displayed on the display device 150. Further, respective functions of the start button and the termination button may be allotted to the keyboard, etc. of the input device 160. In such a case, the voice information acquired in response to respective operations of the start and termination buttons may be associated with any target portion selected by the user, or may be automatically associated with a target portion set immediately before the operation of the start button.

Further, a plurality of items of the voice information may be acquired in association with a single target portion for training. For example, the plurality of items of the voice information are acquired by use of the start and termination buttons, and then the acquired items of the voice information are associated with a target portion selected by the user, for example. Further, in a case where a plurality of items of the voice information are continuously acquired at the time of setting a single target portion for training or immediately after the setting of the single target portion for training, the acquired items of the voice information may be automatically associated with the single target portion.

The additional information acquisition section 20 may acquire tag information representing a type of target for training, for each target portions for training, as a kind of additional information. For example, tag information of "score reading" may be acquired if reading of the musical score by the user has not been completed, and/or tag information of "pitch", "rhythm" or "tempo" may be acquired if a pitch, rhythm or tempo of the musical performance played by the user is fluctuated. Further, tag information of "expression" may be acquired if expression is insufficient in the musical performance played by the user, and/or tag information of "grain of sound" may be acquired if grains of sound in the musical performance played by the user are irregular.

The acquisition of the tag information may be carried out based on an operation of the input device 160 by the user, or may be automatically carried out on the basis of the musical score information acquired by the musical score acquisition section 11 of FIG. 1 and the performance information acquired by the performance information acquisition section 19. For example, in a case where the target portion for training is set based on the difference in tempo or pitch between the original musical score and the actual musical performance as describe above, the tag information of the "tempo", "pitch", etc. may be acquired as for the target portion for training.

(4) Target Musical Score, Target List, and Connected Musical Score

Figure 6:
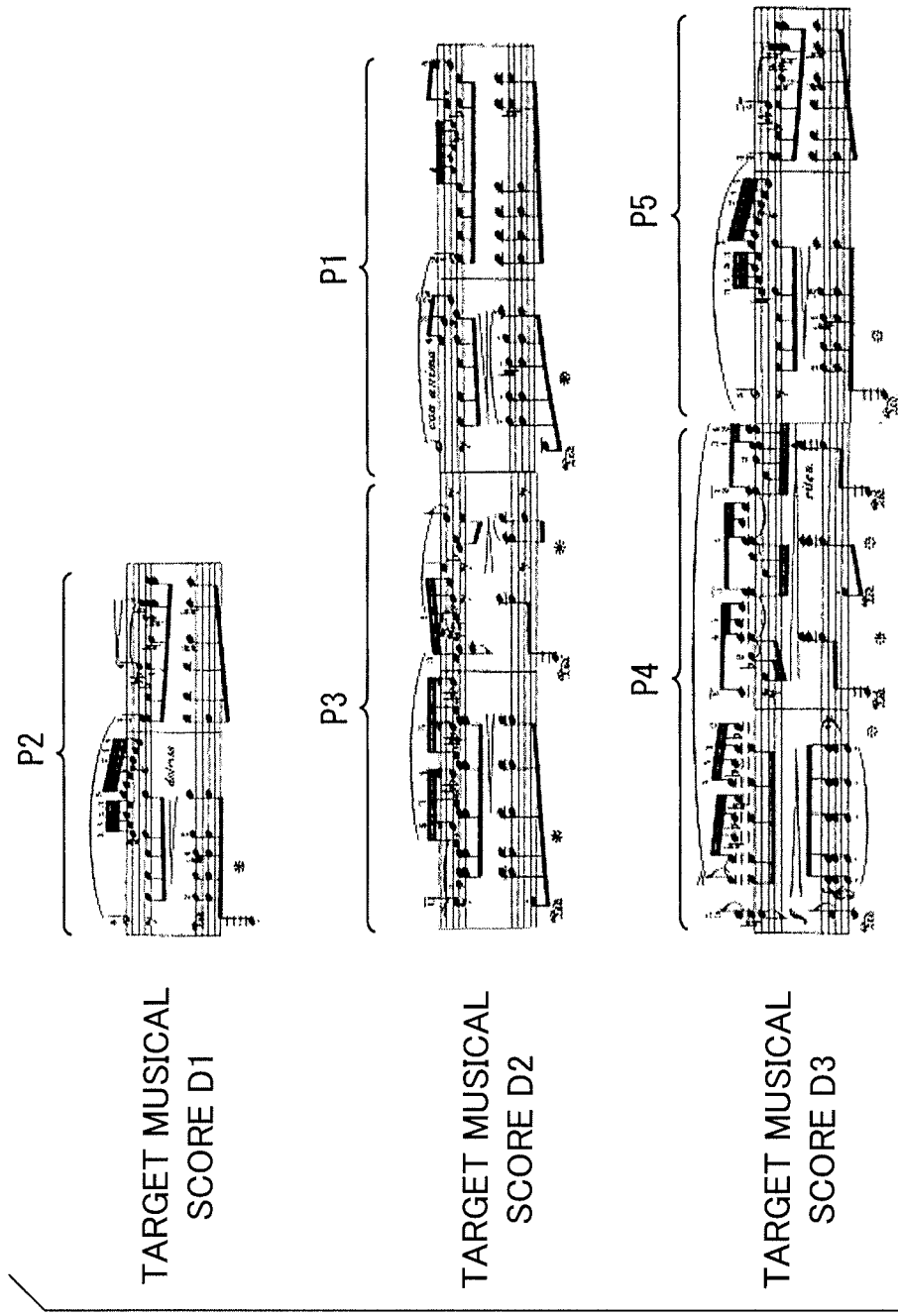
FIG. 6 is a diagram showing an example of target musical scores.

The target musical score acquisition section 14 of FIG. 1 acquires target musical score information representative of a plurality of target musical scores. FIG. 6 is a diagram showing an example of the target musical scores. In FIG. 6, target musical score D1 corresponds to the measure area P2 of FIG. 3, target musical score D2 corresponds to the measure areas P3 and P1 of FIG. 3, and target musical score D3 corresponds to the measure areas P4 and P5 of FIG. 3.

The target list generation section 17 of FIG. 1 generates target list information representative of a target list, and the target musical score display control section 15 causes the display device 150 to display the target list based on the generated target list information. FIG. 7 is a diagram showing an example of the target list. The target list of FIG. 7 lists, for each of the target portions for training, an accomplishment situation on a target for training, a date of setting, a measure area, a target musical score, a degree of importance, a degree of difficulty, tag information, the number of unexercised times and the number of exercised times. In the example, each of the target musical scores is displayed as a thumbnail image representing a part of the measure area. Further, an item for deleting any target portion from the target list is provided in the target list (i.e., an item located at the right end in FIG. 7). The name (title) of the music piece may be added to the target list. Further, the items that are displayed in the target list may be selectable by the user. Various types of the additional information may be displayed in the target list so that the user can carry out training in each of the target portions while or after recognizing the additional information.

In the embodiment, the target list information is generated so that a plurality of the target musical scores are arranged in the display order determined by the display order determination section 16 of FIG. 1. In the example of FIG. 7, the evaluation criterion for determining the display order is the degree of importance. As shown in FIG. 7, the degree of importance for the target portion corresponding to the target musical sore D2 is "5", the degree of importance for the target portion corresponding to the target musical sore D3 is "3", and the degree of importance for the target portion corresponding to the target musical sore D1 is "2". Therefore, the target musical sores D2, D3 and D1 are displayed in order of these degrees of importance.

In this way, because the displayed target musical scores are arranged side by side in order based on the evaluation criterion, the user can easily grasp an order of the target portions to be practiced, etc. Therefore, the user can efficiently practice the plurality of target portions for training. The evaluation criterion to be used is not only the degree of importance but also the degree of difficulty, the number of exercised times, the number of unexercised times, the accomplishment situation on the target for training, the due date of accomplishment of the target for training, or the like. The display order determination section 16 may acquire these evaluation criteria based on the additional information acquired by the additional information acquisition section 20.

The target list generation section 17 may generate the target list information such that the target list includes only target portions corresponding to same tag information. For example, once the user selects one item of tag information from among a plurality of items of tag information, a target list including a plurality of target portions corresponding to the selected one item of tag information may be displayed. In this case, the user can easily grasp the plurality of target portions corresponding to a common target for training.

The user can select one target portion for training from the target list by an operation of the input device 160 of FIG. 2. In such a case, the whole of the target musical score corresponding to the selected target portion for training may be displayed on the display device 150. The user can practice the selected target portion as viewing the displayed target musical score. The additional information acquisition section 20 may count, as for each of the target portions, the number of times that the target portion is selected by the user, and then acquire the count as the additional information.

In order to easily change the displayed target musical score to another one, a "Next" (go to next one) button and a "Prev" (back to previous one) button may be displayed along with the target musical score on the display device. In this case, in response to a depression of the "Next" button, a target musical score corresponding to a next target portion is displayed according to the order indicated in the target list or the order indicated in the original musical score. Further, in response to a depression of the "Prev" button, a target musical score corresponding to a prior target portion is displayed according to the order indicated in the target list or the order indicated in the original musical score.

When the target musical score is displayed on the display device, the performance information may be acquired by the performance information acquisition section 19 of FIG. 1, and a target musical score to be displayed may be automatically altered so as to follow the performance by the user on the basis of the acquired performance information. For example, in a case where the target musical score to be displayed is composed of multiple pages, a page of the musical score to be displayed may be automatically altered so as to follow the performance by the user. Further, in a case where the user practices a plurality of target portions successively, a musical score to be displayed may be automatically altered so as to follow the performance by the user.

When the target musical score is displayed on the display device, a model performance corresponding to the target musical score or an accompaniment therefor may be audibly output via the output device 170. Sound of the model performance or the accompaniment may have been previously recorded, or may be synthesized based on the musical score information. The user can practice the target portion while hearing the output model performance or accompaniment. Further, the performance information may be acquired by the performance information acquisition section 19 of FIG. 1, and a start point, an end point, a speed, etc. of the output model performance or accompaniment may be adjusted so as to follow the performance by the user on the basis of the acquired performance information. Further, a model performance or accompaniment of a particular target portion may be repeatedly output based on the number of unexercised times acquired as the additional information. For example, the model performance or accompaniment of the particular target portion may be repeatedly output the number of times same as the number of unexercised times.

Figure 8:
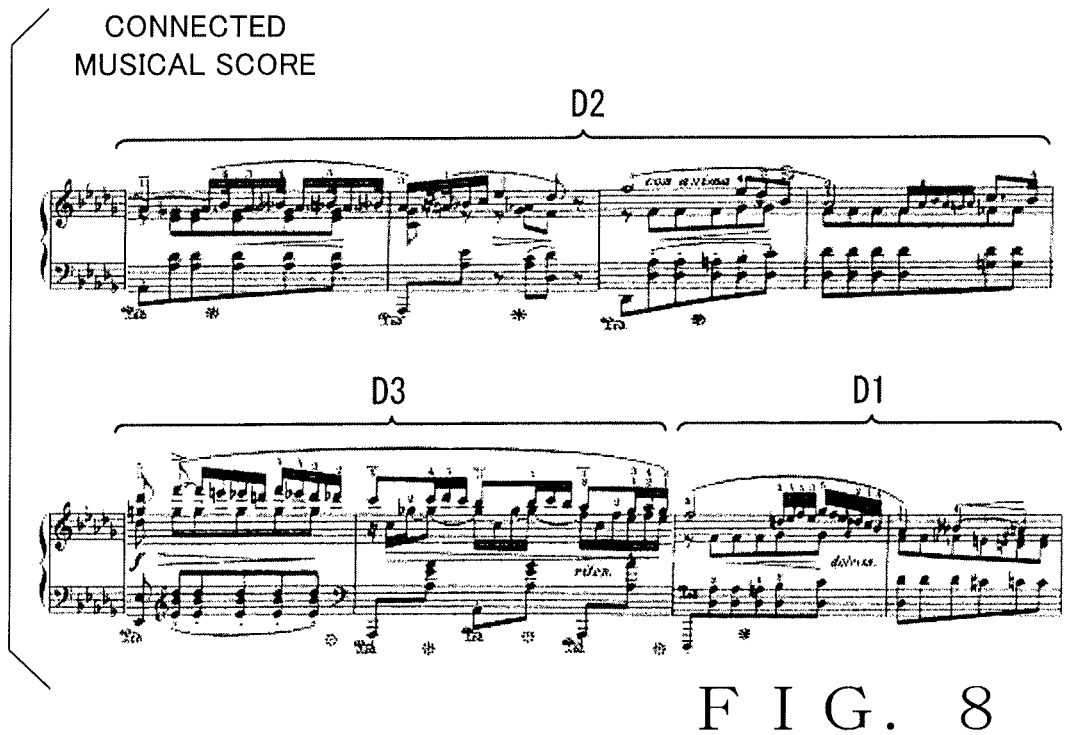
FIG. 8 is a diagram showing an example of a connected musical score.

The connected musical score creation section 18 of FIG. 1 creates the connected musical score information indicative of the connected musical score consisting of a plurality of target musical scores connected with each other, and the target musical score display control section 15 causes the display device 150 to display the connected musical score based on the created connected musical score information. A logical musical score format such as the MusicXML, etc. can be employed in order to create the connected musical score information. FIG. 8 is a diagram showing an example of the connected musical score. In the example of FIG. 8, the target musical scores D1, D2, D3 shown in FIG. 6 are connected. In this example, the target musical scores D1-D3 are connected in the order of D2, D3 and D1 that is determined by the display order determination section 16 of FIG. 1. In a case where the repeat mark is included in the target portion, the repeat mark is not depicted in the displayed target musical score like the target musical scores D2 shown in FIG. 8, and a plurality of measures are displayed in a order to be actually performed. Further, the additional information representative of the degree of difficulty as for each of the target portions, the matters to be noted in performance of each of the target portions or the like may be displayed along with the connected musical score. The user can continuously practice a plurality of target portions while viewing the displayed connected musical score. Namely, because the user can overview the plurality of target musical scores as the connected musical score even if these target musical scores are dispersed in the original musical score, it is not necessary for the user to page the plurality of target portions one after another when he/she collectively practices the plurality of target portions, and as a result, the user can concentrate his/her attention on the practice.

The connected musical score creation section 18 may create the connected musical score information so that only target portions corresponding to the same tag information are to be connected with each other. For example, once the user selects one item of tag information from among the plurality items of tag information, then a connected musical score created by connecting a plurality of target portions corresponding to the selected item of tag information is displayed on the display device. The user can continuously practice the plurality of target portions associated with a common target for training with reference to the displayed connected musical score.

(5) Target Management Process

Figure 9:
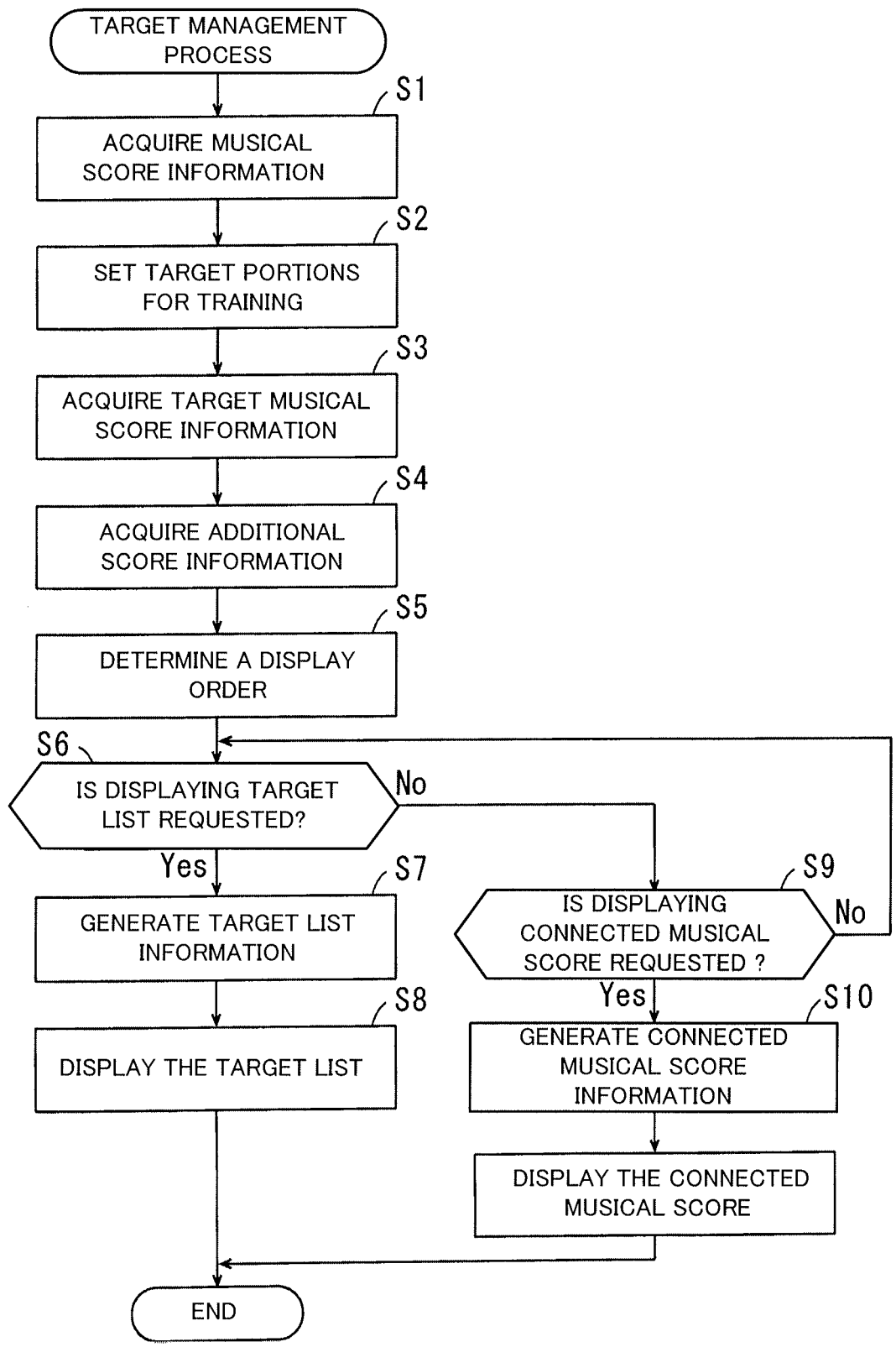
FIG. 9 is a flow chart of a target management process performed by the musical performance assistance apparatus of FIG. 1.

FIG. 9 is a flow chart of the target management process (namely the musical performance assistance process) performed by the musical performance assistance apparatus 100 of FIG. 1. The target management process of FIG. 9 is carried out by the CPU 110 of FIG. 2 executing the target management program stored in the ROM 120.

First, at step S1, the musical score information of the music piece is acquired by the musical score acquisition section 11. Next, at step S2, the plurality of target portions for training in the music piece are set by the target portion setting section 13. As described above, the setting of the target portions may be carried out based on any one or more of an operation of the input device 160, the musical score information and the performance information, the information of the other users, the analysis of the musical score information, etc.

Next, at step S3, the target musical score acquisition section 14 acquires, on the basis of the musical score information acquired by the musical score acquisition section 11, the target musical score information corresponding to the plurality of target portions set by the step S2. Then, at step S4, the additional information is acquired by the additional information acquisition section 20. As described above, the acquisition of the additional information may be carried out based on any one or more of an operation of the input device 160, the analysis of the musical score information, the musical score information and the performance information, the information of the other users, etc.

Next, at step S5, the display order determination section 16 determines, on the basis of the evaluation criteria about the targets for training, the display order of the plurality of target musical scores represented by the target musical score information acquired by the step S3. Then, at step S6, the target list generation section 17 determines, on the basis of a user's operation of the input device 160, whether displaying the target list is requested or not. For example, a "target list" button and a "connected musical score" button are displayed on the display device 160. The user can request for displaying the target list by operating the "target list" button, or can request to display the connected musical score by operating the "connected musical score" button.

When it is determined at step S6 that displaying the target list is requested, at step S7, the target list generation section 17 generates the target list information on the basis of the target musical score information acquired by the step S3. In this case, the target list information is generated such that the plurality of target musical scores should be arranged in the display order determined by the display order determination section 13. Then, at step S8, the target musical score display control section 15 causes the display device 160 to display the target list on the basis of the generated target list information, and thereafter the musical performance assistance apparatus 100 terminates the target management process.

When it is determined at step S6 that displaying the target list is not requested, at step S9, the connected musical score creation section 18 determines whether displaying the connected musical score is requested or not. When it is determined at step S9 that displaying the connected musical score is not requested, then the processing of the step S6 is repeated. When it is determined at step S9 that displaying the connected musical score is requested, at step S10, the connected musical score creation section 18 creates the connected musical score on the basis of the target musical score information acquired by the step S3. In this case, the plurality of target musical scores are connected in the display order determined by the display order determination section 16. Then, the target musical score display control section 15 causes the display device to display the connected musical score on the basis of the created connected musical score (step S8), and then the musical performance assistance apparatus 100 terminates the target management process.

(6) Advantageous Results

Because, in the musical performance assistance apparatus 100 according to the embodiment, the plurality of target musical scores corresponding to the plurality of target portion for training are displayed in the side-by-side arrangement as the target list or the connected musical score, the user can easily grasp the plurality of target portions for training. In this way, it is possible for the user to efficiently practice the plurality of target portions for training.

Further, according to the embodiment, the display order of the plurality of target musical scores is determined on the basis of the evaluation criteria, and the plurality of target musical scores are displayed in the determined display order. Thus, the user can easily grasp an order, etc. of the target portions to be practiced. As a result, efficiency of the practice is enhanced. Thus, the present invention can be effectively employed for management of a target for training of a performance of a music score, etc.

(7) Another Example of Display of Additional Information

Figure 10:
FIG. 10 is a diagram showing an example of display of additional information.

FIG. 10 is a diagram showing an example of display of the additional information. In the example of FIG. 10, the display device 150 and the input device 160 are constructed by the touch panel. The musical score display control section 12 of FIG. 1 displays the original musical score on the touch panel. Stamp buttons SB1, SB2, SB3 and SB4 are displayed on the touch panel so as to overlap the displayed original musical score. In the example, the stamp buttons SB1, SB2, SB3 and SB4 are displayed so as to transparently overlap the displayed original musical score.

The respective stamp buttons SB1, SB2, SB3 and SB4 have respective particular colors different with each other and correspond to respective particular types of additional information different with each other. For example, the stamp button SB1 corresponds to such a type of additional information as to represent that the "score reading" has not been completed, the stamp button SB2 corresponds to such a type of additional information as to represent that the user's performance is out in "pitch", the stamp button SB3 corresponds to such a type of additional information as to represent that the user's performance is insufficient in "expression", and the stamp button SB4 corresponds to such a type of additional information as to represent that the user's performance has another problem. As to each of the stamp buttons SB1, SB2, SB3 and SB4, some characters for schematically explaining the corresponding type of additional information are added thereto. For example, respective character strings of "Score Reading", "Pitch", "Expression" and "Others" are displayed so as to respectively overlap the corresponding stamp buttons SB1, SB2, SB3 and SB4.

It should be noted that the number of the stamp buttons is not limited to four but may be less or more than four. Further, the number of the stamp buttons may be settable by the user to any desired number. Further, each type of the additional information corresponding to each stamp button may be previously defined or may be settable by the user to any desired type. The plurality of the stamp buttons may have different patterns or shapes with each other.

A cursor CS for designating any position in the original musical score is displayed on the touch panel. For example, the user can move the cursor CS to a desired position in the original musical score on the touch panel by the drag operation. Further, in a case where the model performance of the original musical score is output based on the previously-stored (recorded) voice information, the cursor CS may be automatically moved so as to point out a current performance position following the output of the model performance.

Upon an operation of any one of the stamp buttons, a stamp image corresponding to the operated stamp button is displayed at a location designated by the cursor CS in the original musical score. In the example of FIG. 10, a stamp image ST1 corresponding to the stamp button SB1 and stamp images ST2 and ST3 each corresponding to the stamp button SB4 are displayed in the original musical score. Each of the stamp images has the same color as the corresponding stamp button. In the example, the stamp image ST1 has the same color as the stamp button SB1, and the stamp images ST2 and ST3 have the same color as the stamp button SB4. In such a case, the user can instinctively grasp the additional information by glancing at the stamp image displayed in the original musical score on the touch panel.

In a case where the plurality of stamp buttons have different patterns with each other as mentioned above, each of the stamp images may have the same pattern as the corresponding stamp button. Also, in a case where the plurality of stamp buttons have different shapes with each other, each of the stamp images may have the same shape as the corresponding stamp button.

Once any one of the stamp buttons is operated, the additional information acquisition section 20 of FIG. 1 acquires the additional information corresponding to the operated stamp button. The additional information may be acquired as the tag information such as the "score reading", the "pitch", etc. Further, the target portion setting section 13 may set a portion in the original musical score encompassing a stamp image, e.g., on a measure basis, as a target portion for training.

In a case where the cursor CS is automatically moved following the output of the performance, the user can operate any stamp button as hearing the output model performance. In an embodiment, a performance played by the user may stored (recorded) as the voice information for monitoring, and thereafter the user or trainer can operate any stamp button as hearing an output of the monitored performance. In such a case, the user or trainer can recognize various problems to be practiced such as a difference in tempo, insufficient in expression, etc. on the basis of the output of the monitored performance. A suitable stamp image can be efficiently displayed in response to an operation of a corresponding stamp button at the time of being recognized such problems by them.

Note that, in a case where a stamp button is operated as the performance is output, because the stamp button would be operated after they have auditorily recognized a location where a stamp image should be displayed, there is a high possibility such that, at the time of the operation of the stamp button, the cursor CS would point out another location after the location where the stamp image should be displayed. In view of this point, in a case where a stamp button is operated as the performance is output, the stamp image may be displayed at a location where the cursor CS pointed out at a time point of a predetermined time length (e.g., two second) earlier than the time of the operation of the stamp button.

In an embodiment, weighting can be carried out for each stamp image. For example, once the same stamp button has been operated repeatedly many times as for the same location, a weight of the corresponding stamp image may be increased by the number of times of the operation. Further, the greater the weight is, the larger the stamp image may be displayed. In the example of FIG. 10, the weight of the stamp image ST2 is greater than the respective weights of the stamp images ST1 and ST3. Therefore, the stamp image ST2 is depicted larger than the respective stamp images ST1 and ST3. In a case where different stamp buttons are operated in relation to the same location, different stamp images may be displayed in relation to the same location and different weights may be set to the different stamp images respectively.

The additional information acquisition section 20 of FIG. 1 may determine the degree of importance, the number of unexercised times, etc. for each target portion on the basis of the number of stamp images displayed for each target portion, or may determines the degree of importance, the number of unexercised times, etc. for each target portion on the basis of the number of stamp images and the weights thereof for each target portion. Further, the display order determination section 16 of FIG. 1 may determine the display order of the plurality of the target musical scores on the basis of the number of stamp images displayed for each target portion, or may determines determine the display order of the plurality of the target musical scores on the basis of the number of stamp images and the weights thereof for each target portion. In a case where the determination based on the number of stamp images and the weights thereof is carried out, for example, the weight of the stamp image may be represented by any numerical value of "1" to "5" and the weight of the stamp image may be converted into the number of stamp image on the basis of the numerical value. In such a case, it is treated for such a every case to be equivalent where there are provided four stamp images each having the same weight of the numerical value "1", where there are provided two stamp images each having the same weight of the numerical value "2", and where there is provided one stamp image having the weight of the numerical value "4", for example.

In the example of FIG. 10, any one of the different stamp images corresponding to four different types of target for training is displayed in response to a selective operation of any one of four stamp buttons SB1, SB2, SB3 and SB4, but alternatively, other stamp images corresponding to a plurality of different types of target for training may be respectively displayed in another manner. For example, the plurality of different types of target for training may be associated with a plurality of directions (e.g., vertical and horizontal) on the touch panel. The user may carry out such an operation of his/her finger as to quickly slide in any one of the plurality of directions (namely, a flick operation). In this case, a type of target for training is determined based on the direction of the sliding of the finger, and then a stamp image corresponding thereto is displayed.

Further, in the example of FIG. 10, the stamp image is displayed at the location pointed out by the cursor CS, but alternatively, any desired measure (bar), performance part, note, rest or the like may be designated by the tap operation, and then a stamp image may be displayed at the designated location. Further, in the example of FIG. 10, the stamp image is displayed in the displayed original musical score, but alternatively, the stamp image may be displayed in the displayed target musical scores or the displayed connected musical score in a manner similar to aforementioned.

(8) Other Embodiments

Although the aforementioned embodiment displays the plurality of the target musical scores in the display order determined on the basis of the evaluation criteria related to the target for training, the present invention is not limited to such an embodiment. For example, the plurality of the target musical scores may be displayed in an order according to the original musical score, or may be displayed in an order of the dates when each of the target musical scores has been set.

Further, whereas the target portion for training is set on a measure basis in the aforementioned embodiment, the present invention is not limited to such an embodiment. For example, the target portion for training may be set on a stave basis in a musical score, or may be set on a beat basis in a musical score, or may be set on a note basis in a musical score.

Further, whereas a plurality of the target portions for training are set as for a single music piece in the aforementioned embodiment, the plurality of the target portions for training may set as for a plurality of music pieces. In such a case, a title of each of the music pieces may be acquired as included in the tag information, and the target list or the connected musical score may be displayed for each of the music pieces on the basis of the title included in the tag information.

It should be noted that a server apparatus located on a communication network may be functioned as the musical performance assistance apparatus 100 and the server apparatus may execute the target management process (namely, the musical performance assistance process) in the same manner as aforementioned. Further, the target management program (namely, the musical performance assistance program) may be provided as a web application program, and the target management program (musical performance assistance program) may be performed by execution of the web application program by the CPU 110.

The target management program (namely, the musical performance assistance program) is not limited to the aforementioned embodiment. The target management program (namely, the musical performance assistance program) is configured to cause the computer (or the processor) to execute: setting a plurality of portions of a music piece to be practiced by a user as target portions for training; acquiring partial musical scores as target musical scores, each of the partial musical scores representing at least a part of one of the target portions for training; and displaying two or more of the acquired target musical scores in a side-by-side arrangement on a display device.

Further, the target management program (namely, the musical performance assistance program) may be provided in a state having stored it in a non-transitory computer-readable medium such as a digital versatile disk (DVD), a flash memory, a memory card, etc.

What is claimed is:

1. A musical performance assistance apparatus comprising:
a display device; and
a processing device configured to function as:
a target portion setting section that sets a plurality of portions of a music piece to be practiced by a user as target portions for training;
a target musical score acquisition section that acquires partial musical scores as target musical scores, each of the partial musical scores representing at least a part of one of the target portions for training set by the target portion setting section; and
a display control section that causes the display device to display two or more of the target musical scores, acquired by the target musical score acquisition section, in a side-by-side arrangement.

2. The musical performance assistance apparatus as claimed in claim 1, wherein the processing device is further configured to function as a display order determination section that determines a display order of the target musical scores corresponding to the target portions for training on the basis of respective evaluation criteria for respective ones of the target portions, and wherein the display control section causes the display device to display the target musical scores in the display order determined by the display order determination section.

3. The musical performance assistance apparatus as claimed in claim 1, wherein the processing device is further configured to function as a connected musical score creation section that creates a connected musical score consisting of two or more of the target musical scores connected with each other, and wherein the display control section causes the display device to display the connected musical score created by the connected musical score creation section.

4. The musical performance assistance apparatus as claimed in claim 1, wherein the processing device is further configured to function as a performance information acquisition section that acquires performance information representative of a performance of the music piece performed by the user, and wherein the target portion setting section sets the target portions for training from a whole musical score of the music piece on the basis of the performance information acquired by the performance information acquisition section.

5. The musical performance assistance apparatus as claimed in claim 1, wherein the processing device is further configured to function as an additional information acquisition section that acquires additional information related to at least one of the target portions for training set by the target portion setting section, and wherein the display control section causes the display device to display the additional information along with the target musical score corresponding to the additional information.

6. The musical performance assistance apparatus as claimed in claim 5, wherein the display control section causes the display device to display a graphic image symbolizing content of the additional information to be displayed along with the target musical score corresponding to the additional information.

7. The musical performance assistance apparatus as claimed in claim 6, wherein the graphic image is adjusted in size in accordance with a weight of the additional information symbolized by the graphic image.

8. The musical performance assistance apparatus as claimed in claim 5, wherein the additional information acquisition section causes the display device to display a plurality of types of the graphic images symbolizing different types of the additional information, and acquires, in response to any one of the plurality of types of the graphic images selected by the user, one of the types of the additional information corresponding to the selected type of the graphic images.

9. The musical performance assistance apparatus as claimed in claim 8, wherein the plurality of types of the graphic images symbolizing different types of the additional information are transparently displayed in such a manner as to maintain visibility of other images which are displayed on a screen of the display device with overlapping with the plurality of types of the graphic images.

10. The musical performance assistance apparatus as claimed in claim 1, wherein the target portion setting section sets one or more measures within the music piece as one of the target portions for training.

11. The musical performance assistance apparatus as claimed in claim 1, further comprising a memory, wherein the processing device is further configured to function as a memory control section that controls the target musical scores acquired by the target musical score acquisition section to be stored into the memory in association with the user, and wherein the display control section causes the display device to display the two or more of the target musical scores in the side-by-side arrangement on the basis of reading out the target musical scores stored in the memory.

12. The musical performance assistance apparatus as claimed in claim 11, wherein the memory stores the target musical scores in association with individual ones of a plurality of users, and wherein the display control section causes, on the basis of reading out a plurality of target musical scores, from the memory, associated with a user selected from among the plurality of users, the display device to display two or more of the target musical scores, of the plurality of target musical scores associated with the selected user, in the side-by-side arrangement.

13. A method for musical performance assistance, comprising:

setting a plurality of portions of a music piece to be practiced by a user as target portions for training;

acquiring partial musical scores as target musical scores, each of the partial musical scores representing at least a part of one of the target portions for training; and displaying two or more of the acquired target musical scores in a side-by-side arrangement on a display device.

14. A non-transitory computer-readable storage medium containing a group of instructions executable by a processor to perform a method for musical performance assistance, the method comprising:

setting a plurality of portions of a music piece to be practiced by a user as target portions for training;

acquiring partial musical scores as target musical scores, each of the partial musical scores representing at least a part of one of the target portions for training; and displaying two or more of the acquired target musical scores in a side-by-side arrangement on a display device.

* * * * *